(12) United States Patent
Lee et al.

(10) Patent No.: US 10,179,501 B2
(45) Date of Patent: Jan. 15, 2019

(54) DOOR STRUCTURE FOR VEHICLE

(71) Applicants: Hyundai Motor Company, Seoul (KR); Kia Motors Corporation, Seoul (KR)

(72) Inventors: Hyeokji Lee, Jinju-si (KR); Gon Kim, Hwaseong-si (KR); Jeong Hyeon Kim, Seoul (KR); Jae Hyuk Cheong, Hwaseong-si (KR); Rae Sung Park, Bucheon-si (KR); In Jea Lee, Incheon (KR); Hee Min Ha, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/615,164

(22) Filed: Jun. 6, 2017

(65) Prior Publication Data

US 2018/0162204 A1  Jun. 14, 2018

(30) Foreign Application Priority Data

Dec. 13, 2016 (KR) .................. 10-2016-0169847

(51) Int. Cl.
*B60J 5/04* (2006.01)
(52) U.S. Cl.
CPC .......... *B60J 5/0443* (2013.01); *B60J 5/0463* (2013.01); *B60J 5/0481* (2013.01); *B60J 5/0484* (2013.01)

(58) Field of Classification Search
CPC ...... B60J 5/0443; B60J 5/0463; B60J 5/0484; B60J 5/0481
USPC .... 296/146.6, 146.5, 187.12, 146.1, 202, 30
See application file for complete search history.

(56) References Cited

U.S. PATENT DOCUMENTS

| 6,390,533 | B1* | 5/2002 | Furuse | B60J 5/0425 |
| | | | | 296/146.5 |
| 9,499,032 | B2* | 11/2016 | Ikeda | B60J 5/101 |
| 2005/0001448 | A1* | 1/2005 | Omori | B60J 5/0431 |
| | | | | 296/146.7 |
| 2010/0148535 | A1* | 6/2010 | Takahashi | B60J 5/0426 |
| | | | | 296/187.12 |
| 2016/0159207 | A1* | 6/2016 | Ogawa | B60J 5/0427 |
| | | | | 49/504 |

FOREIGN PATENT DOCUMENTS

| JP | 2016-022937 A | 2/2016 |
| JP | 2016-141377 A | 8/2016 |
| KR | 97-4843 U | 2/1997 |
| KR | 10-2008-0004978 A | 1/2008 |

* cited by examiner

*Primary Examiner* — Jason S Morrow
*Assistant Examiner* — E Turner Hicks
(74) *Attorney, Agent, or Firm* — Morgan, Lewis & Bockius LLP

(57) ABSTRACT

A door structure for a vehicle may include an external panel that forms an external side surface of the vehicle; a reinforcement beam that is engaged with the external panel; an internal panel of a reinforced plastic material that is engaged with the reinforcement beam; and a fastener that fixes the internal panel and the reinforcement beam.

14 Claims, 6 Drawing Sheets

DOOR STRUCTURE FOR VEHICLE

CROSS-REFERENCE TO RELATED APPLICATION

The present application claims priority to Korean Patent Application No. 10-2016-0169847 filed on Dec. 13, 2016, the entire contents of which is incorporated herein for all purposes by this reference.

BACKGROUND OF THE INVENTION

Field of the Invention

The present invention relates to a door structure for a vehicle. More particularly, the present invention relates to a door structure for a vehicle that forms a door by coupling an outer panel that is made of a metal material and an inner panel that is made of a Carbon Fiber Reinforced Plastics (CFRP) material.

Description of Related Art

In general, a vehicle door is rotatably mounted in a vehicle body through a hinge in order to have a function of opening and closing a vehicle passenger compartment that is formed by the vehicle body.

Nowadays, for enhancement of fuel consumption of a vehicle, decrease in weight of the vehicle has been in the spotlight, and therefore an attempt has been continuously performed that produces a vehicle door using other materials, for example a carbon fiber reinforced plastics (CFRP) material instead of a steel sheet.

The vehicle door is generally formed by coupling an outer panel that is positioned at the outside of a width direction of a vehicle and an inner panel that is positioned at the inside thereof, both the outer panel and the inner panel may be made of a CFRP material, but with a reason such as appropriate rigidity sustenance of the door, the outer panel is made of a steel sheet or an aluminum material and the inner panel is made of a CFRP material and development of a heterogeneous material of vehicle door that is coupled with the panels has been performed.

When configuring the heterogeneous material of vehicle door, a method is required that can optimize a mounting structure of a rigid beam (impact beam) and a mutual coupling structure of the outer panel and the inner panel.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a door structure for a vehicle having advantages of being configured for reducing the component number and a weight and cost by configuring a door by coupling an external panel that is made of a metal material and an internal panel and a rigid beam that include a CFRP material.

Various aspects of the present invention are directed to providing a door structure for a vehicle including: an external panel that forms an external side surface of the vehicle; a reinforcement beam that is engaged with the external panel; an internal panel of a reinforced plastic material that is engaged with the reinforcement beam; and a fastener that fixes the internal panel and the reinforcement beam.

One side edge portion of the external panel may be hemmed at one end portion of the reinforcement beam to fix the external panel and the reinforcement beam.

The reinforcement beam may include: a first reinforcement member that is fixed to the external panel through hemming; a second reinforcement member that is integrally bent with the first reinforcement member to be extended to the inside of a vehicle body; and a third reinforcement member that is integrally bent with the second reinforcement member to be extended in a direction in which the external panel is formed.

The internal panel may include: a first internal member that is disposed to contact an internal side surface of a hemming portion that is hemmed from the external panel to the first reinforcement member; and a second internal member that is integrally formed with the first internal member and that has a form that is bent by a predetermined angle with the first internal member and that is extended to the inside of the vehicle body and that is disposed to contact an external surface of one side of the second reinforcement member.

The fastener may penetrate the second internal member and the second reinforcement member to fix the internal panel and the reinforcement beam.

The fastener may include: an insertion member that is inserted into a hole that is formed in the second internal member and the second reinforcement member; and a fixing member that is engaged with the insertion member to fix the insertion member to the internal panel and the reinforcement beam.

The third reinforcement member may be extended in a direction in which the external panel is disposed and gradually approach to the external panel, and one side thereof may have a structure that contacts the external panel.

The internal panel of the reinforced plastic material may be made of carbon fiber reinforced plastic (CFRP), and the outer panel may be made of a metal material.

The door structure may further include a fixed protrusion that is fixed to an internal surface of the external panel to determine a position of the reinforcement beam.

The fixed protrusion may be injected and hardened at an internal surface of the external panel.

In the reinforcement member, a latch groove may be formed in which the fixed protrusion is latched.

The latch groove may be formed in a bent portion to which the first reinforcement member and the second reinforcement member are connected.

Both end portions of the reinforcement beam may connect both end portions of the front-rear direction of the internal panel, and at both side edge portions of the reinforcement beam, protrusions may be formed at a predetermined gap.

At a center portion of a longitudinal direction of the reinforcement beam, a slot may be formed at a predetermined position.

Various aspects of the present invention are directed to providing a door structure for a vehicle including: an external panel of a metal material that forms an external side surface of the vehicle; a reinforcement beam of a metal material that hems one side of an edge portion of the external panel to be engaged with the external panel; an internal panel of a nonmetal material that is engaged with the reinforcement beam; and a fastener that penetrates a close contact portion of the internal panel and the reinforcement beam to fix the internal panel and the reinforcement beam.

According to an exemplary embodiment of the present invention for achieving such an object, a weight can be reduced and fuel consumption can be enhanced through an internal panel that is made of a CFRP material.

Further, by hemming coupling a reinforcement beam and an external panel and by coupling a reinforcement beam and an internal panel through a fastener, an assembling ability and productivity are improved, maintenance can be improved, and the number of components and a weight can be reduced.

Further, a reinforcement beam that is fixed to an external panel can be easily disposed at an accurate position using a fixing protrusion that is injected and fixed to an external panel.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
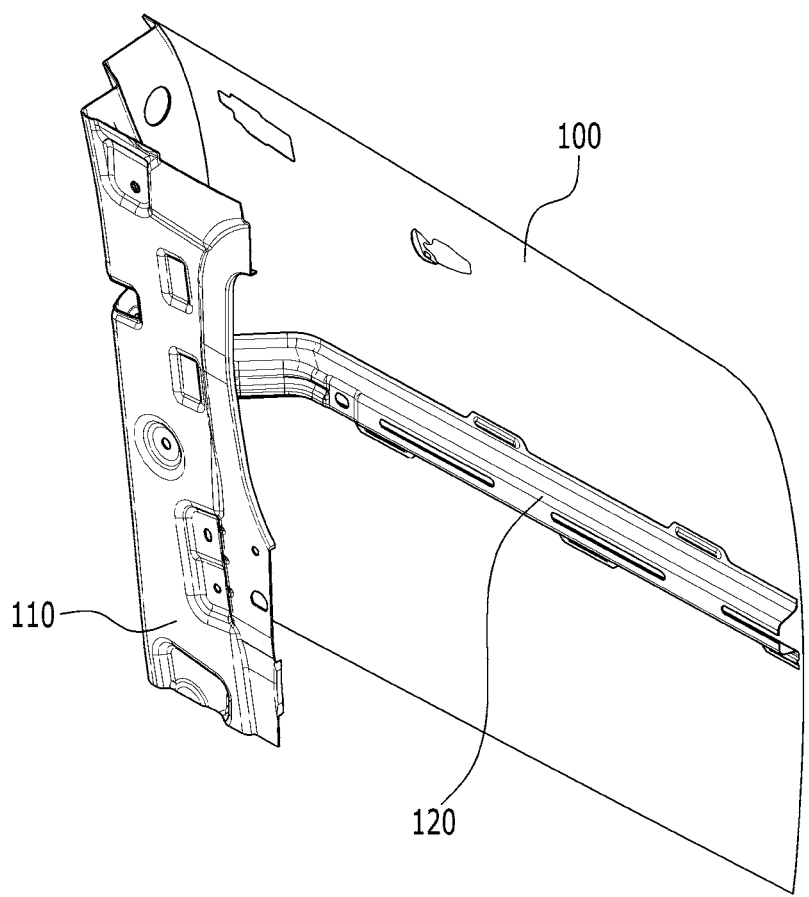
FIG. 1 is a perspective view illustrating a door structure for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Further, in the drawings, a size and thickness of each element are randomly represented for better understanding and ease of description, and the present invention is not limited thereto and the thickness of several portions and areas are exaggerated for clarity.

The drawings and description are to be regarded as illustrative in nature and not restrictive. Like reference numerals designate like elements throughout the specification.

In the following description, terms including a first and a second used in names of constituent elements are used for distinguishing constituent elements having the same name and do not limit order thereof.

FIG. 1 is a perspective view illustrating a door structure for a vehicle according to an exemplary embodiment of the present invention.

Referring to FIG. 1, the vehicle door structure includes an external panel 100, a reinforcement beam 120, and an internal panel 110 as constituent elements.

The external panel 100 forms an external side surface of the vehicle, the internal panel 110 is disposed at the inside of the external panel 100, and the reinforcement beam 120 is disposed between the internal panel 110 and the external panel 100. Here, the reinforcement beam 120 is extended in the front-rear direction of the vehicle.

In an exemplary embodiment of the present invention, the internal panel 110 may be made of carbon fiber reinforced plastic (CFRP), and the external panel 100 and the reinforcement beam 120 may be made of a metal material.

Further, the external panel 100 and the internal panel 110 include different materials and are made of CFRP, and it is difficult that the external panel 100 and the internal panel 110 hemming couple. However, the reinforcement beam 120 and the external panel 100 are hemming coupled, and the reinforcement beam 120 and the internal panel 110 are engaged using a fastener.

A connection structure between the external panel, the internal panel, and the reinforcement beam will be described in detail with reference to FIG. 2.

Figure 2:
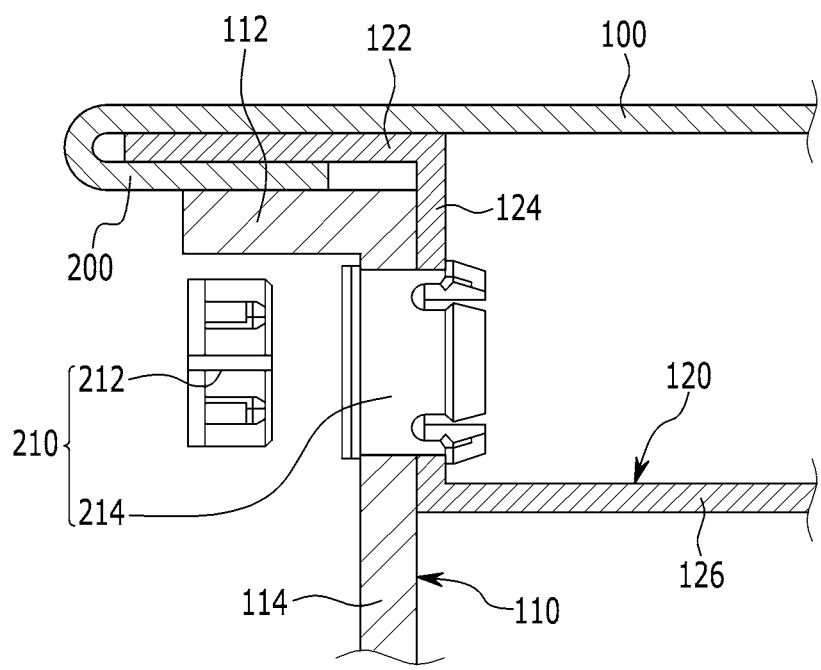
FIG. 2 is a partially cross-sectional view illustrating a state in which a door structure for a vehicle is coupled according to an exemplary embodiment of the present invention.

FIG. 2 is a partially cross-sectional view illustrating a state in which a door structure for a vehicle is coupled according to an exemplary embodiment of the present invention.

Referring to FIG. 2, the vehicle door structure includes an external panel 100, a reinforcement beam 120, an internal panel 110, and a fastener 210 as constituent elements, the external panel 100 includes a hemming portion 200, the reinforcement beam 120 includes a first reinforcement member 122, a second reinforcement member 124, and a third reinforcement member 123, the internal panel 110 includes a first internal member 112 and a second internal member 114, and the fastener 210 includes an insertion member 214 and a fixing member 212.

The reinforcement beam 120 includes a first reinforcement member 122 that comes in close contact with an internal side surface of the external panel 100, a second reinforcement member 124 that is integrally bent with the first reinforcement member 122 to be extended to the inside of a vehicle body, and a third reinforcement member 123 that is integrally bent with the second reinforcement member 124 to be extended in the front-rear direction of the vehicle body.

A rear end portion of the external panel 100 is bent by 180 to the inside of the vehicle body to be hemmed in the first reinforcement member 122 of the reinforcement beam 120. Therefore, the external panel 100 and the reinforcement beam 120 are bonded through the hemming portion 200.

The internal panel 110 includes a first internal member 112 that contact an external surface of the hemming portion 200 and a second internal member 114 that is integrally formed with the first internal member 112 and that has a form that is bent by about 90° and that is extended to the inside of the vehicle body.

The fastener 210 penetrates the second internal member 114 and the second reinforcement member 124 of the internal panel 110 to fix the internal panel 110 and the reinforcement beam 120.

In an exemplary embodiment of the present invention, the fastener 210 may be disposed at a predetermined gap along the internal panel 110 and the reinforcement beam 120.

Figure 3:
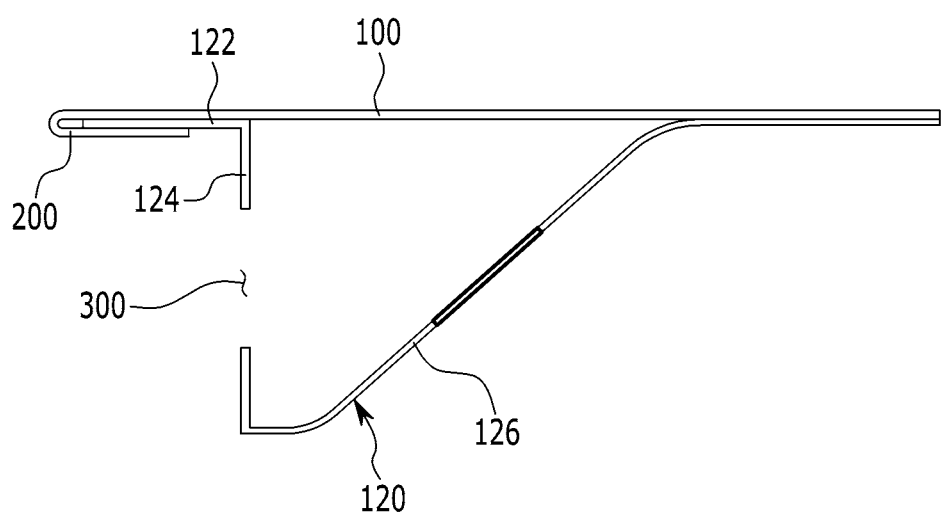
FIG. 3 is a partially cross-sectional view of a door structure for a vehicle according to an exemplary embodiment of the present invention.

FIG. 3 is a partially cross-sectional view of a door structure for a vehicle according to an exemplary embodiment of the present invention.

Referring to FIG. 3, the external panel 100 is hemming coupled to the first reinforcement member 122 of the reinforcement beam 120 through the hemming portion 200, and in the second reinforcement member 124, a fastener hole 300 that inserts and engages the fastener 210 is formed.

Unlike a structure of FIG. 2, the third reinforcement member 123 has a slanted structure gradually approaching to an internal side surface of the external panel 100 to the front side, and a partial segment of the third reinforcement member 123 may have a structure that contacts an internal side surface of the external panel 100.

Figure 4:
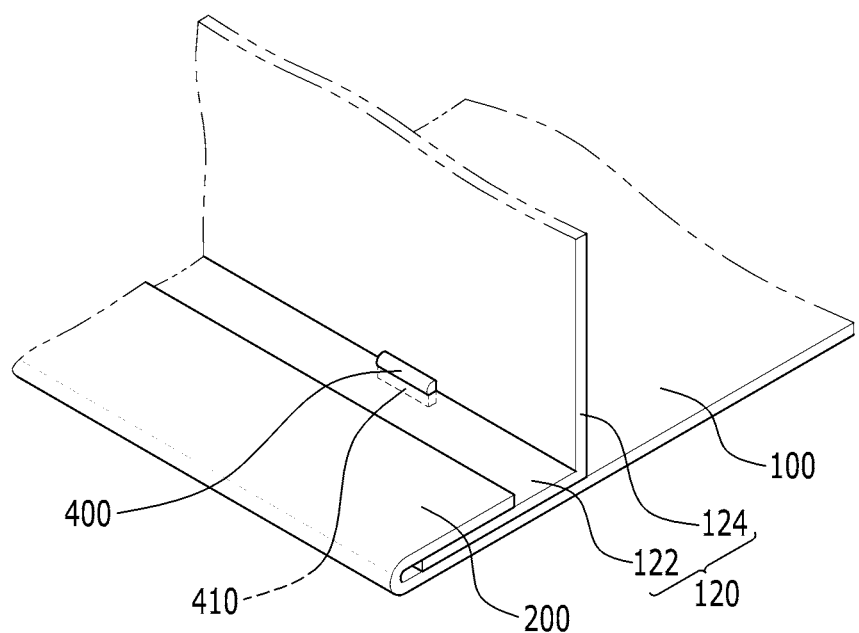
FIG. 4 is a partially perspective view of a door structure for a vehicle according to an exemplary embodiment of the present invention.

FIG. 4 is a partially perspective view of a door structure for a vehicle according to an exemplary embodiment of the present invention.

Referring to FIG. 4, the vehicle door structure includes an external panel 100, a hemming portion 200, a first reinforcement member 122, a second reinforcement member 124, and a fixing protrusion 400 as constituent elements.

The fixing protrusion 400 injects a resin to be fixed to an internal side surface of the external panel 100. The fixing protrusion 400 determines a position of the reinforcement beam 120.

Figure 5:
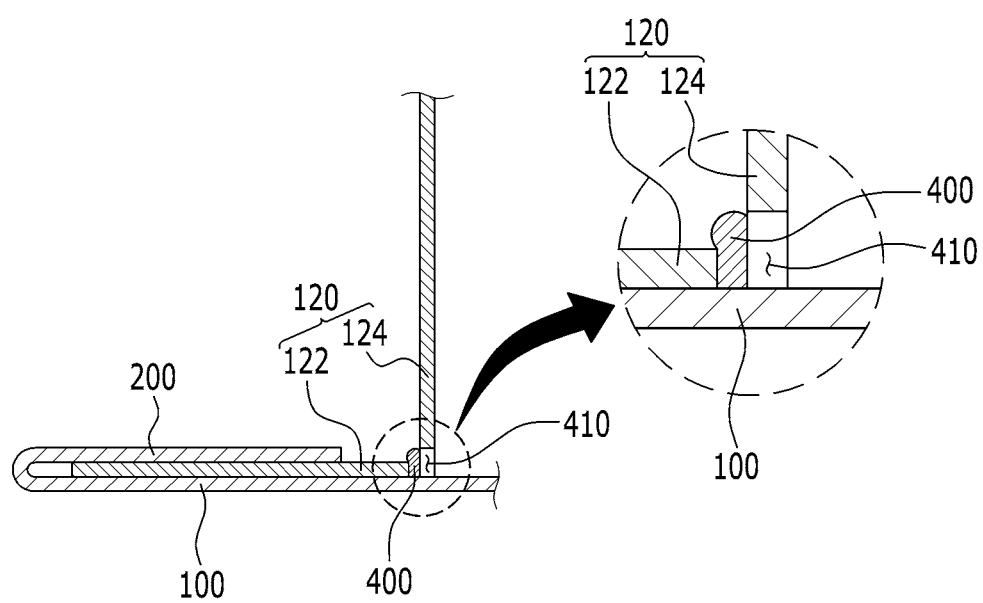
FIG. 5 is a partially cross-sectional view of a door structure for a vehicle according to an exemplary embodiment of the present invention.

Referring to FIG. 5, an engagement structure between the fixing protrusion and the reinforcement beam will be described in detail.

FIG. 5 is a partially cross-sectional view of a door structure for a vehicle according to an exemplary embodiment of the present invention.

Referring to FIG. 5, an edge portion of one end portion of the external panel 100 is hemmed and bonded to the first reinforcement member 122 of the reinforcement beam 120, and at a bent portion of the first reinforcement member 122 and the second reinforcement member 124, a latch groove 410 is formed.

In an exemplary embodiment of the present invention, before hemming the external panel 100 in the first reinforcement member 122 of the reinforcement beam 120, the reinforcement beam 120 and the external panel 100 are coupled such that the fixing protrusion 400 is inserted into the latch groove 410 by come in close contact the first reinforcement member 122 of the reinforcement beam 120 with one surface of the external panel 100 and by moving the reinforcement beam 120.

The hemming portion 200 is formed by hemming an edge portion of one end portion of the external panel 100, and simultaneously with hemming, the external panel 100 is bonded to the first reinforcement member 122 of the reinforcement beam 120.

Figure 6:
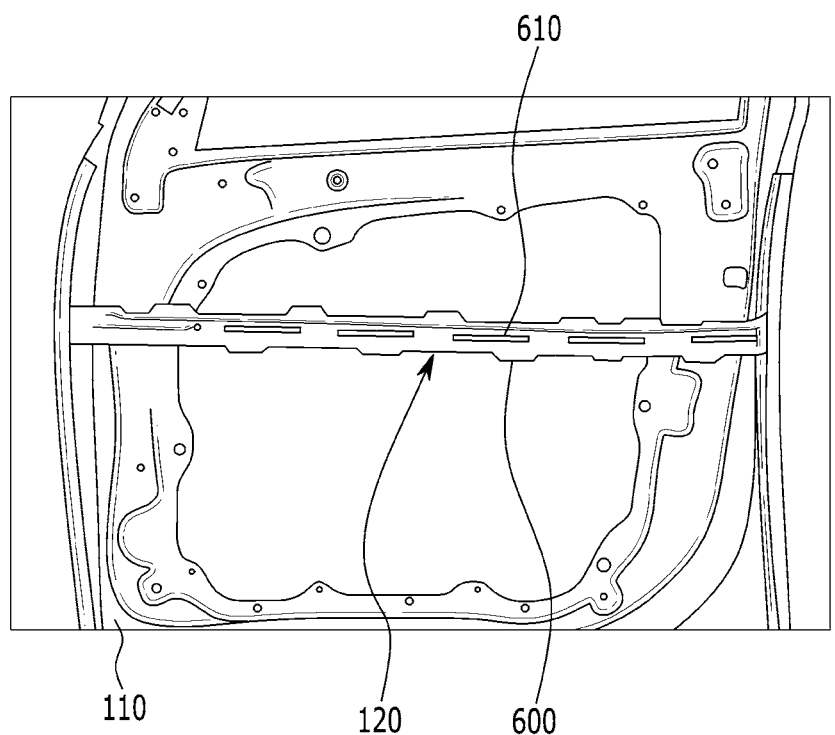
FIG. 6 is a perspective view illustrating a state in which a reinforcement beam is disposed in a door structure for a vehicle according to an exemplary embodiment of the present invention.

FIG. 6 is a perspective view illustrating a state in which a reinforcement beam is disposed in a door structure for a vehicle according to an exemplary embodiment of the present invention.

Referring to FIG. 6, the reinforcement beam 120 connects both end portions of the front and the rear of the internal panel 110, and at corners of both side edge portions of the reinforcement beam 120, protrusions 600 are each formed, and a protrusion that is formed at one side edge portion and a protrusion that is formed at the other side edge portion are alternately disposed.

Further, at a center portion of a longitudinal direction of the reinforcement beam 120, a predetermined length of slot 610 is formed, and the slot 610 is disposed at a predetermined gap in a longitudinal direction of the reinforcement beam 120.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A door structure for a vehicle, comprising:
   an external panel that forms an external side surface of the vehicle;
   a reinforcement beam that is engaged with the external panel;
   an internal panel that is engaged with the reinforcement beam; and
   a fastener that fixes the internal panel and the reinforcement beam,
   wherein the reinforcement beam includes:
      a first reinforcement member that is fixed to the external panel through hemming;
      a second reinforcement member that is integrally bent with the first reinforcement member to be extended to an inside of a vehicle body; and
      a third reinforcement member that is integrally bent with the second reinforcement member to be extended in a direction in which the external panel is formed, and
   wherein the internal panel includes:
      a first internal member that is disposed to contact an internal side surface of a hemming portion that is hemmed from the external panel to the first reinforcement member; and a second internal member that is integrally formed with the first internal member and that has a form that is bent by a predetermined angle with the first internal member and that is extended to the inside of the vehicle body and that is disposed to contact an external surface of a first side of the second reinforcement member.

2. The door structure of claim 1, wherein a first side edge portion of the external panel is hemmed at a first end portion of the reinforcement beam to fix the external panel and the reinforcement beam.

3. The door structure of claim 1, wherein the fastener penetrates the second internal member and the second reinforcement member to fix the internal panel and the reinforcement beam.

4. The door structure of claim 3, wherein the fastener includes:
   an insertion member that is configured to be inserted into a hole that is formed in the second internal member and the second reinforcement member; and
   a fixing member that is engaged with the insertion member to fix the insertion member to the internal panel and the reinforcement beam.

5. The door structure of claim 1, wherein the third reinforcement member is extended in a direction in which the external panel is disposed and approaches to the external panel, and a first side thereof has a structure that contacts the external panel.

6. The door structure of claim 1, wherein the internal panel is made of carbon fiber reinforced plastic (CFRP), and the external panel is made of a metal material.

7. The door structure of claim 1, further including a fixed protrusion that is fixed to an internal surface of the external panel to determine a position of the reinforcement beam.

8. The door structure of claim 7, wherein the fixed protrusion is injected and hardened at an internal surface of the external panel.

9. The door structure of claim 7, wherein in the reinforcement member, a latch groove is formed in which the fixed protrusion is latched.

10. The door structure of claim 9, wherein the latch groove is formed in bent portion to which the first reinforcement member and the second reinforcement member are connected.

11. The door structure of claim 1, wherein first and second end portions of the reinforcement beam connect first and second end portions of a predetermined direction of the internal panel, and
    at first and second side edge portions of e reinforcement beam, protrusions are formed at a predetermined gap.

12. The door structure of claim 11, wherein at a center portion of a longitudinal direction of the reinforcement beam, a slot is formed at a predetermined position.

13. A door structure for a vehicle, the door structure including:
    an external panel of a metal material that forms an external side surface of the vehicle;
    a reinforcement beam of a metal material that hems a first side of an edge portion of the external panel to be engaged with the external panel;
    an internal panel of a nonmetal material that is engaged with the reinforcement beam; and
    a fastener that penetrates a contact portion of the internal panel and the reinforcement beam to fix the internal panel and the reinforcement beam,
    wherein the reinforcement beam includes:
        a first reinforcement member that is fixed to the external panel through hemming;
        a second reinforcement member that is integrally bent with the first reinforcement member to be extended to an inside of a vehicle body; and
        a third reinforcement member that is integrally bent with the second reinforcement to be extended in a direction in which the external panel is formed, and
    wherein the internal panel includes:
        a first internal member that is disposed to contact an internal side surface of a hemming portion that is hemmed from the external panel to the first reinforcement member; and
        a second internal member that is integrally formed with the first internal member and that has a form that is bent by a predetermined angle with the first internal member and that is extended to the inside of the vehicle body and that is disposed to contact an external surface of a first side of the second reinforcement member.

14. The door structure of claim 1, wherein the internal panel is made of a reinforced plastic material.

* * * * *